Patented Sept. 28, 1943

2,330,685

UNITED STATES PATENT OFFICE 2,330,685

CATALYST

Gerald C. Connolly, Baton Rouge, La., assignor to Standard Oil Development Company, a corporation of Delaware No Drawing. Application November 30, 1940, Serial No. 367,949

5 Claims. (Cl. 252—251)

The present invention relates to an improved catalyst and is more particularly concerned with improving the absorptive, catalytic and catalyst carrier properties of natural clays by partial peptization by means of organic acids and the like. In accordance with the present invention these improvements are secured by the partial peptization of natural or acid treated natural clays utilizing an organic acid such as acetic acid or formic acid.

It is well known in the art to prepare synthetic catalysts by means of various procedures which comprise treating these catalysts with acids. However, these methods employed for the manufacture and treatment of synthetic gels and the like have not been particularly effective in the treatment of natural products. I have, however, now discovered a process for treating natural or acid treated natural clays which comprises a partial peptization operation employing an organic acid.

Although the process may be adapted for the treatment of any naturally occurring clay, it is preferred that the clay be one of the bentonite or semi-bentonite type. The operation may be readily adapted to the treatment of clays which have not been previously acid treated. However, in general, it is preferred to treat a clay of the bentonite or semi-bentonite type with a mineral acid, as for example, sulfuric acid or hydrochloric acid in order to remove most of the deleterious bodies such as the alkalies in order to improve the decolorizing and regeneration properties. The acid treated clay resulting is a hydrous, aluminum silicate or a hydrous magnesium aluminum silicate.

These clays in accordance with the present process are treated with a relatively low molecular weight organic acid. In general these organic acids have a structural formula RCOOH in which R represents a substance selected from the group consisting of hydrogen and alkyl groups. The alkyl groups should preferably contain from 1 to 4 carbon atoms in the group. Particularly desirable acids comprise formic acid and acetic acid. An especially preferred acid comprises acetic acid the concentration of which is in the range from about 2% to 10%, preferably in the range from about 4% to 5%.

The method of contacting the clay with the acid is quite important. The clay is moistened and then digested with the acid after which the moistened clay is dried. Another method of contacting the clay with the acid is to cover the clay with an acetic acid solution. The clay and acetic acid solution is heated either with or without pressure to a temperature in the general range from about 80° F. to 300° F. The acetic acid solution is then removed and the clay dried.

In the preparation of the catalyst of the present invention it is essential that the clay being peptized with the organic acid be in the hydrated form. The action of the peptizing agent is on the alumina and apparently redistributes the alumina in a more active form by putting it in a more gel like structure.

In order to further illustrate the invention, the following examples are given which should not be construed as limiting the same in any manner whatsoever.

Various catalytic cracking operations were conducted at a temperature of about 850° F. and at atmospheric pressure using a feed rate of 0.6 volume of oil per volume of catalyst per hour. Two hour cycles were employed. In a number of operations conventional catalysts were employed while in other operations the catalysts of the present invention were utilized. The results of the various operations are as follows.

The feed stock to the catalytic cracking unit comprises a gas oil derived from an East Texas crude which gas oil had a gravity of approximately 33° A. P. I. and boiled in the general range from about 400° F. to 700° F.

Table

| Operation | Catalyst | Temp. °F. at which catalyst activated | Cycle | Product, per cent distilled Engler at 400° F. $D+L$ |
|---|---|---|---|---|
| I | Acid treated activated clay sold under name of "Super Filtrol." | 850 | 1 | 41.0 |
|  |  |  | 2 | 40.5 |
|  |  |  | 3 | 41.0 |
| II | Same as I | 1,400 | 1 | 35.5 |
|  |  |  | 2 | 33.5 |
|  |  |  | 3 | 32.5 |
| III | Same as I except peptized with 5% acetic acid. | 850 | 1 | 41.0 |
|  |  |  | 2 | 42.0 |
|  |  |  | 3 | 43.0 |
| IV | Same as III | 1,400 | 1 | 38.0 |
|  |  |  | 2 | 36.5 |
|  |  |  | 3 | 35.5 |
| V | Same as I except impregnated with 5% H. F. | 850 | 1 | 37.5 |
|  |  |  | 2 | 41.0 |
|  |  |  | 3 | 38.5 |
| VI | Same as I except peptized with 5% acetic acid, impregnated with 5% H. F. | 850 | 1 | 45.0 |
|  |  |  | 2 | 47.5 |
|  |  |  | 3 | 46.5 |

From the above it is evident that the cracking activity of the clay has been increased by the peptization treatment. It is also apparent that the peptized product is more heat stable as evidenced by greater activity after the 1400° F. activation. The clay was decidedly improved by a treatment comprising initially contacting the same with acetic acid and then impregnating the same with hydrogen fluoride. This was a decided unexpected result since previous tests indicated that the cracking activity of the clay was seriously impaired by treatment with hydrogen fluoride.

The peptized product of the present invention is particularly improved with respect to heat stability. It therefore may be heated to temperatures considerably in excess of those normally allowable for the unpeptized materials. This is extremely desirable particularly with respect to natural clay and acid treated natural clay but the greatest disadvantage incurred when utilizing these clays is the excessive drop in efficiency of the same after repeated regeneration cycles.

The peptized naturally occurring clay of the present invention may be used in various manners. It may be employed in the catalyst or the carrier for catalyst and may be utilized in liquid or vapor phase operations. However, the peptized naturally occurring clay of the present invention is particularly adapted for utilization in catalytic cracking and reforming operations in which petroleum oil falling in the motor fuel and gas oil boiling range are subjected to temperature in the general range of about 800° to 1100° F. and at pressures in the range from atmospheric to superatmospheric pressure.

The peptized naturally occurring clay may also be impregnated with a suitable metal compound such as molybdenum of tungsten sulfide. These peptized naturally occurring clays may also be used as a carrier for various hydrogenation catalysts.

The process of the present invention is not to be limited by any theory or mode of operation but only in and by the following claims in which it is desired to claim all novelty.

I claim:

1. Process which comprises treating a naturally occurring clay of the bentonite or semi-bentonite type with a mineral acid selected from the group consisting of sulfuric and hydrochloric acids to remove alkalies and to produce a hydrous aluminum silicate, treating the latter at about 80–300° F. with a 2–10% solution of an organic acid having the general formula RCOOH, where R is selected from the group consisting of hydrogen and alkyl groups having 1–4 carbon atoms, and drying the resultant treated product at an activating temperature.

2. Process according to claim 1, in which the amount of organic acid solution used is at least enough to moisten the silicate being treated but not substantially more than enough to cover said silicate.

3. Process which comprises treating bentonite with a mineral acid selected from the group consisting of sulfuric and hydrochloric acids to remove alkalies and to produce a hydrous aluminum silicate, treating the latter at about 80°–300° F. with a 4–5% solution of acetic acid, and activating the resultant treated product by heating it to about 850° F.

4. Process which comprises treating bentonite with a mineral acid to remove alkalies and to produce a hydrous aluminum silicate, treating the latter at about 80–300° F. with a 4–5% solution of acetic acid, impregnating the treated product with about 5% of hydrogen fluoride, and heating the resultant product to about 850° F.

5. Process for the production of a catalyst suitable for the cracking and reforming of petroleum oils boiling in the motor fuel and gas oil ranges comprising treating a naturally occurring clay with a mineral acid to remove alkalies and to produce a hydrous aluminum silicate, moistening the said acid treated clay with a 2–10% solution of a monobasic carboxylic acid containing not more than four carbon atoms, digesting the moistened clay and impregnating the same with hydrogen fluoride, and thereafter drying the said clay to produce a cracking and reforming catalyst.

GERALD C. CONNOLLY.